(12) United States Patent
Nathan et al.

(10) Patent No.: US 8,849,753 B2
(45) Date of Patent: Sep. 30, 2014

(54) AUTOMATING ASYNCHRONOUS PROGRAMMING IN SINGLE THREADED SYSTEMS

(75) Inventors: Adam D. Nathan, Redmond, WA (US); Andrew Sterland, Seattle, WA (US); Michael J. Leonard, Lake Stevens, WA (US); Timothy Rice, Bellevue, WA (US); John I. Montgomery, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1420 days.

(21) Appl. No.: 12/123,472

(22) Filed: May 20, 2008

(65) Prior Publication Data

US 2009/0293073 A1    Nov. 26, 2009

(51) Int. Cl.
*G06F 17/30* (2006.01)
*G06F 9/54* (2006.01)

(52) U.S. Cl.
CPC ..................................... *G06F 9/547* (2013.01)
USPC ........................................................ 707/613

(58) Field of Classification Search
CPC ............ G06F 11/2074; G06F 11/2076; G06F 13/4239; G06F 17/30578
USPC .................. 707/612, 613, 614, 615, 656, 658
See application file for complete search history.

(56) References Cited

U.S. PATENT DOCUMENTS

| | | | |
|---|---|---|---|
| 6,219,711 B1 * | 4/2001 | Chari | 709/232 |
| 6,560,626 B1 * | 5/2003 | Hogle et al. | 718/102 |
| 6,658,453 B1 | 12/2003 | Dattatri | |
| 7,003,570 B2 | 2/2006 | Messinger et al. | |
| 7,177,918 B2 | 2/2007 | Joshi et al. | |
| 7,269,833 B2 | 9/2007 | Kushnirskiy | |
| 7,614,019 B2 * | 11/2009 | Rimas Ribikauskas et al. | 715/863 |
| 7,739,325 B1 * | 6/2010 | Okita et al. | 709/200 |
| 7,739,656 B2 * | 6/2010 | Beisiegel et al. | 717/106 |
| 8,161,501 B2 * | 4/2012 | Turk | 719/330 |
| 2002/0073135 A1 * | 6/2002 | Meyer | 709/107 |
| 2003/0172128 A1 | 9/2003 | Bloomquist et al. | |
| 2004/0003325 A1 * | 1/2004 | Muller et al. | 714/38 |

(Continued)

OTHER PUBLICATIONS

"A JavaScript Wrapper for Making Asynchronous Function and Object Method Calls", http://devedge-temp.mozilla.org/toolbox/examples/2003/CCallWrapper/index_en.html.

(Continued)

*Primary Examiner* — Anteneh Girma
*Assistant Examiner* — Fatima Mina
(74) *Attorney, Agent, or Firm* — Kevin Sullivan; Kate Drakos; Micky Minhas

(57) ABSTRACT

Various technologies and techniques are disclosed for automating asynchronous programming in single threaded systems. A wrapper is automatically generated around an original function. When metadata indicates the wrapper should be utilized for asynchronous data retrieval, the wrapper calls a data retrieving function asynchronously. Asynchronous retrieval of data is initiated from the data retrieving function using a direct callback. A specially marked exception is thrown to cause control to leave and get caught by a special exception in the wrapper. When the direct callback function is called because the data has been retrieved, the data is saved. The wrapper is called again in a synchronous fashion, which causes the wrapper, original function, and data retrieving function to be called again. When the data retrieving function is called again, data that was saved by the direct callback function is retrieved, and then returned to the calling function through the callback function.

18 Claims, 14 Drawing Sheets

(56) References Cited

U.S. PATENT DOCUMENTS

| | | |
|---|---|---|
| 2005/0125508 A1* | 6/2005 | Smith et al. .................... 709/220 |
| 2006/0126657 A1* | 6/2006 | Beisiegel et al. .............. 370/465 |
| 2006/0167981 A1* | 7/2006 | Bansod et al. ................. 709/203 |
| 2006/0248207 A1 | 11/2006 | Olson et al. |
| 2007/0174419 A1 | 7/2007 | O'Connell et al. |
| 2007/0244990 A1 | 10/2007 | Wells |
| 2007/0266145 A1 | 11/2007 | Nesbitt et al. |

OTHER PUBLICATIONS

Myers, et al., "MapJAX: Data Structure Abstractions for AsynchronousWeb Applications", In Proceedings of the 2007 USENIX Annual Technical Conference, (Santa Clara, CA), Jun. 2007, pp. 1-14.

* cited by examiner

// A1. Asynchronous Call Code Example var mainObject = new Wrapper(); ⎯⎯ 232 mainObject.getPhotos("cat", function(result) { /* Display result in an async callback */}); ⎯⎯ 234

FIG. 3

```
// B. Auto-generated Wrapper Code Example function Wrapper() { this.__realObject = new MainObject(); }
Wrapper.prototype.getPhotos = function(term)
{
    recordInfoAboutTheCurrentCall(...); ⎯⎯242
    try
    {
        return this.__realObject.getPhotos(term); ⎯⎯244
    }
    catch (ex)
    {
        if (/*this isn't the special AsyncOperationPendingException*/) ⎯⎯246
            throw ex;
    }
}
```

FIG. 4

```
// C. Original Function Code Example
MainObject.prototype.getPhotos = function(term)
{    // Do some initialization
     var url = "..." + term;

// Make the call
252—var result = getData(url, ...); // (B) The synchronous-
     looking data-fetching function // Potentially process the result // Return the result
     return result;
}
```

FIG. 5

```
// D. Data-Fetching Function Code Example
function getData(url, ...)
{
    if (/* there is a saved result ready to be returned */)
    {
        // Grab the saved result and return it
        var savedData = ...;
        return savedData;
    }
    else if (isSyncCall)
    {
        // Make synchronous retrieval of data and return the result
        var data = ...;
        return data;
    }
    else
    {
        // Initiate async request then throw the special exception
        InitiateAsyncRequestWithCallback(url, ..., directCallback);
        throw new AsyncOperationPendingException();
    }
};
```

FIG. 6

```
// E. Direct Callback Function Example function directCallback(result, ...)
{
    // Save the result, so it can be retrieved the next time getData is called
    saveResult(result, ...);

// Call (B) again in a synchronous fashion
    var returnValue = callFunctionWithTheFollowingArguments(savedInstance, savedFunction, savedArguments);

// Now pass the result to (F)
    savedCallback(returnValue);
}
```

FIG 7

// F. Consumer's Callback Function Example (in italics)

mainObject.getPhotos("cat", *function(result)* { /* Display result in an async callback */ });

```
// A. Synchronous Call Code Example var mainObject = new Wrapper();  // 332 var result = mainObject.getPhotos("cat");  // 334
/* Display result after the synchronous call returns */
```

FIG.10

```
// B. Auto-generated Wrapper Code Example function Wrapper() { this.__realObject = new MainObject(); }
Wrapper.prototype.getPhotos = function(term)
{
    recordInfoAboutTheCurrentCall(...); ⎯⎯ 342
    try
    {
        return this.__realObject.getPhotos(term); ⎯⎯ 344
    }
    catch (ex)
    {
        if (/*this isn't the special AsyncOperationPendingException*/) ⎯⎯ 346
            throw ex;
    }
}
```

```
// C. Original Function Code Example

MainObject.prototype.getPhotos = function(term)
{
    // Do some initialization
    var url = " ... " + term;

// Make the call
    var result = getData(url, ...); // (B) The synchronous-looking data-    ___372
fetching function // Potentially process the result
    ...

// Return the result
    return result;
}
```

FIG. 12

```
// D. Data-Fetching Function Code Example
function getData(url, ...)
{
    if (/* there is a saved result ready to be returned */)  // 402
    {
        // Grab the saved result and return it
        var savedData = ...;
        return savedData;
    }
    else if (isSyncCall)  // 404
    {
        // Make synchronous retrieval of data and return the result
        var data = ...;
        return data;
    }
    else  // 406
    {
        // Initiate async request then throw the special exception
        InitiateAsyncRequestWithCallback(url, ..., directCallback);
        throw new AsyncOperationPendingException();
    }
};
```

FIG.13

AUTOMATING ASYNCHRONOUS PROGRAMMING IN SINGLE THREADED SYSTEMS

BACKGROUND

A software application typically has a user interface that enables an end user to interact with the functionality of the software application. User interface processing is usually performed on a main (user interface) thread. In some software applications, all processing is performed on the main thread, either because multiple threads are not supported or because the application was written using just one thread. In such scenarios, the user interface waits for all processing to finish before allowing the user to continue interacting with the software application. By pausing further interaction while processing occurs, a user may be given the impression that the software application is "locked up", when in reality it is just still processing some operation.

Some software applications support the ability to take advantage of multiple threads, where certain background work can be performed separately from the main thread. Such background operations are termed "asynchronous", because they can be performed independently of the main thread. When an asynchronous operation completes, it calls back a previously designated function to let that function know the work is now completed.

Many programming environments, such as JavaScript running in a web browser, do not support the concept of multiple threads. This is one reason why web pages can hang for long periods as data is fetched or a calculation is executed.

SUMMARY

Various technologies and techniques are disclosed for automating asynchronous programming in single threaded systems. A wrapper is automatically generated around an original function. When metadata indicates that the wrapper should be utilized for asynchronous retrieval of data, then the wrapper is utilized to call a data retrieving function asynchronously. In such a scenario, an asynchronous retrieval of data is initiated from the data retrieving function using a direct callback function. After initiating the asynchronous retrieval of data, a specially marked exception is thrown from the data retrieving function to cause control to leave the data retrieving function and the original function and get caught by a special exception in the wrapper. When the direct callback function is called because the data has been retrieved, the data is saved from the direct callback function. The wrapper is called again in a synchronous fashion, which causes the wrapper, the original function, and the data retrieving function to be called a second time. When the data retrieving function is called the second time, the data that was saved by the direct callback function is retrieved. When control returns to the direct callback function, the data retrieved by the data retrieving function is returned to the calling function by calling a consumer callback function identified for the calling function In one implementation, the metadata allows a software developer to control whether synchronous versus asynchronous processing is used by simply changing the metadata.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 illustrates some exemplary source code for one implementation that illustrates exemplary metadata for designating that a particular function should be called asynchronously.

FIG. 4 illustrates some exemplary source code for a hypothetical wrapper of one implementation.

FIG. 5 illustrates some exemplary source code for an original function that is being called from the source code of FIG. 3 through the wrapper of FIG. 4.

FIG. 6 illustrates some exemplary source code for a data retrieving function that is called from the original function of FIG. 5.

FIG. 7 illustrates some exemplary source code for a direct callback function that returns results back to the original function.

FIG. 8 illustrates some exemplary source code that designates the callback function that will be called by the code of FIG. 7 when the results are ready to be returned.

FIG. 10 illustrates some exemplary source code for one implementation that illustrates exemplary metadata for designating that a particular function should be called synchronously.

FIG. 11 illustrates some exemplary source code for a hypothetical wrapper of one implementation.

FIG. 12 illustrates some exemplary source code for an original function that is being called from the source code of FIG. 10 through the wrapper of FIG. 11.

FIG. 13 illustrates some exemplary source code for a data retrieving function that is called from the original function of FIG. 12.

DETAILED DESCRIPTION

The technologies and techniques herein may be described in the general context as an application that automates asynchronous programming in a single threaded system, but the technologies and techniques also serve other purposes in addition to these. In one implementation, one or more of the techniques described herein can be implemented as features within a browser-based software development application such as MICROSOFT® Popfly, a framework or software development platform such as MICROSOFT®.NET Framework, or from any other type of program or service that enables for the creation and/or execution of applications that are single threaded.

In one implementation, a process for coding asynchronous behavior is automated for a software developer for a single threaded environment. The system provides technologies and techniques that create an asynchronous operation that appears to be synchronous in an environment that is single threaded. The developer just specifies whether or not he wants the operation to be performed synchronously or asynchronously, and the system takes care of the behind the scenes work for making the otherwise complex asynchronous operation happen when requested. The result is much simpler code that the software developer needs to write in order to get asynchronous functionality. The term "asynchronous" as used herein is meant to include an action executed in a non-blocking scheme, allowing the main program flow to continue processing. The term "synchronous" as used herein is meant to include an action that is executed in a blocking scheme, thereby blocking a single thread from performing other tasks until the synchronous action completes.

Figure 1:
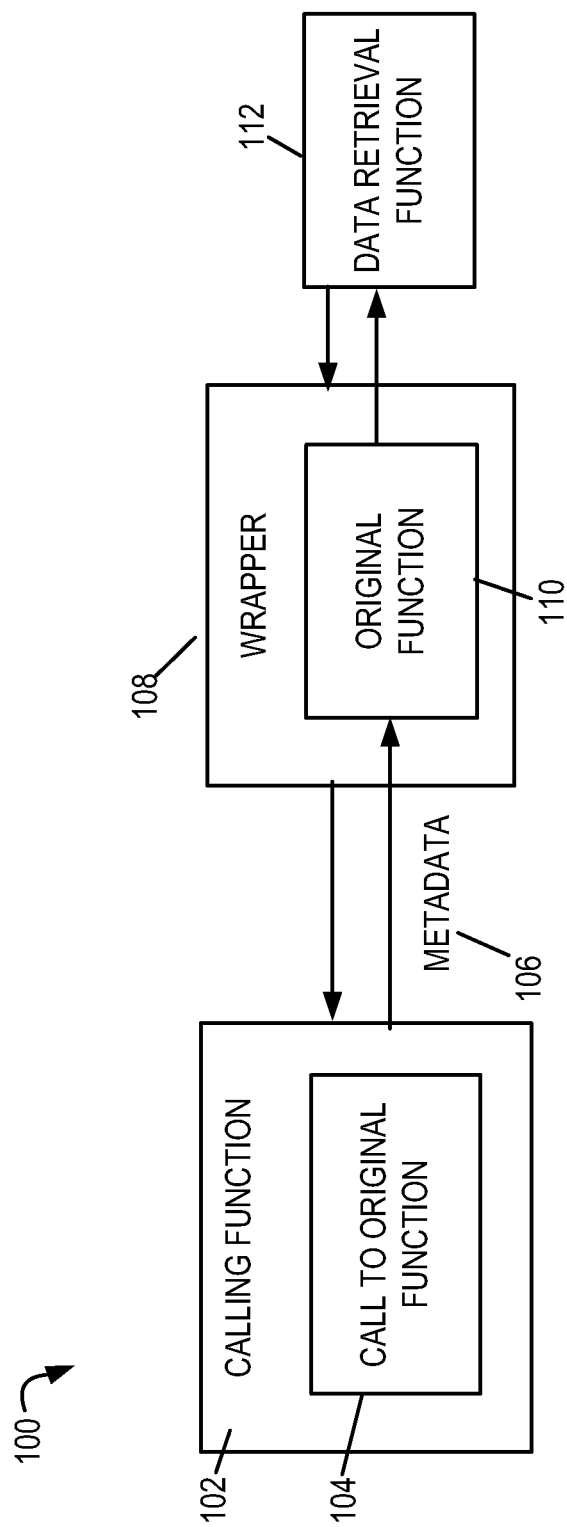
FIG. 1 is a diagrammatic view of an automated asynchronous programming system of one implementation utilizing a wrapper in a single threaded environment.

Turning now to FIG. 1, a diagrammatic view of an automated asynchronous programming system 100 for one implementation of a single threaded environment is shown. Examples of single threaded environments can include browser-based environments, such as those using JavaScript, where only a main thread (often called the user interface thread) is supported. In the implementation shown, a wrapper 108 is created around an original function 110 so that a call 104 from a calling function 102 is made to the original function 110 through the wrapper 108. The term "wrapper" as used herein is meant to include a function, procedure, framework, or other grouping of logic that wraps an original function to add an additional layer of functionality and/or context to the original function. Examples of a wrapper are shown in FIGS. 4 and 11 and are described in detail in FIGS. 2-13. The term "original function" as used herein is meant to include a function, procedure, or other grouping of logic that is designed to carry out one or more tasks. Examples of an original function are shown in FIGS. 5 and 12 and are also described in detail in FIGS. 2-13.

In asynchronous programming system 100, metadata 106 is used to indicate whether calls to a data retrieving function 112 should be made synchronously or asynchronously by the original function 110. The term "metadata" as used herein is meant to include one or more portions of information or the absence thereof that can be used to indicate one or more details regarding the operation of asynchronous programming system 100. In the implementation shown in FIG. 1, metadata 106 is contained in the call 104 from the calling function 102 to the original function 110, such as in a parameter to the function call itself. However, it will be appreciated that in other implementations, metadata could be specified in other locations, such as in a location that is accessible to a process implementing functionality for the original function 110 and/or the wrapper 108. The term "data retrieving function" as used herein is meant to include a function, procedure, or other logic that is used to retrieve and/or process data that is used by the system 100. The term "calling function" as used herein is meant to include a function, procedure, or other logic that makes a call to an original function.

As described in further detail in the figures that follow, by simply changing metadata 106, a software developer can change between synchronous and asynchronous processing of the data retrieval function 112 without having to make further modifications to the code beyond the metadata change. The wrapper 108 is then created to wrap the original function 110. In one implementation, the wrapper 108 is created programmatically by system 100, which can be at runtime. In one implementation, a wrapper is used when either asynchronous or synchronous processing has been indicated in the metadata, but in the synchronous scenario, the wrapper does not really add additional value. In another implementation, a wrapper is only created when asynchronous processing has been indicated in the metadata, and is not utilized for synchronous scenarios.

When asynchronous processing has been specified by the metadata 106, the wrapper 108 is then utilized in combination with a special exception handler and a direct callback function to enable the data retrieving function to return results asynchronously in a manner that appears to be synchronous. These techniques are described in detail in FIGS. 2-13. FIGS. 2-8 illustrate the usage of a wrapper for an asynchronous scenario, and FIGS. 9-13 illustrate the usage of a wrapper for a synchronous scenario.

Turning now to FIGS. 2-13, some stages and exemplary techniques for implementing one or more implementations of system 100 are described in further detail. In some implementations, the techniques of FIG. 2-13 are at least partially implemented in the operating logic of computing device 500 (of FIG. 14).

Figure 2:
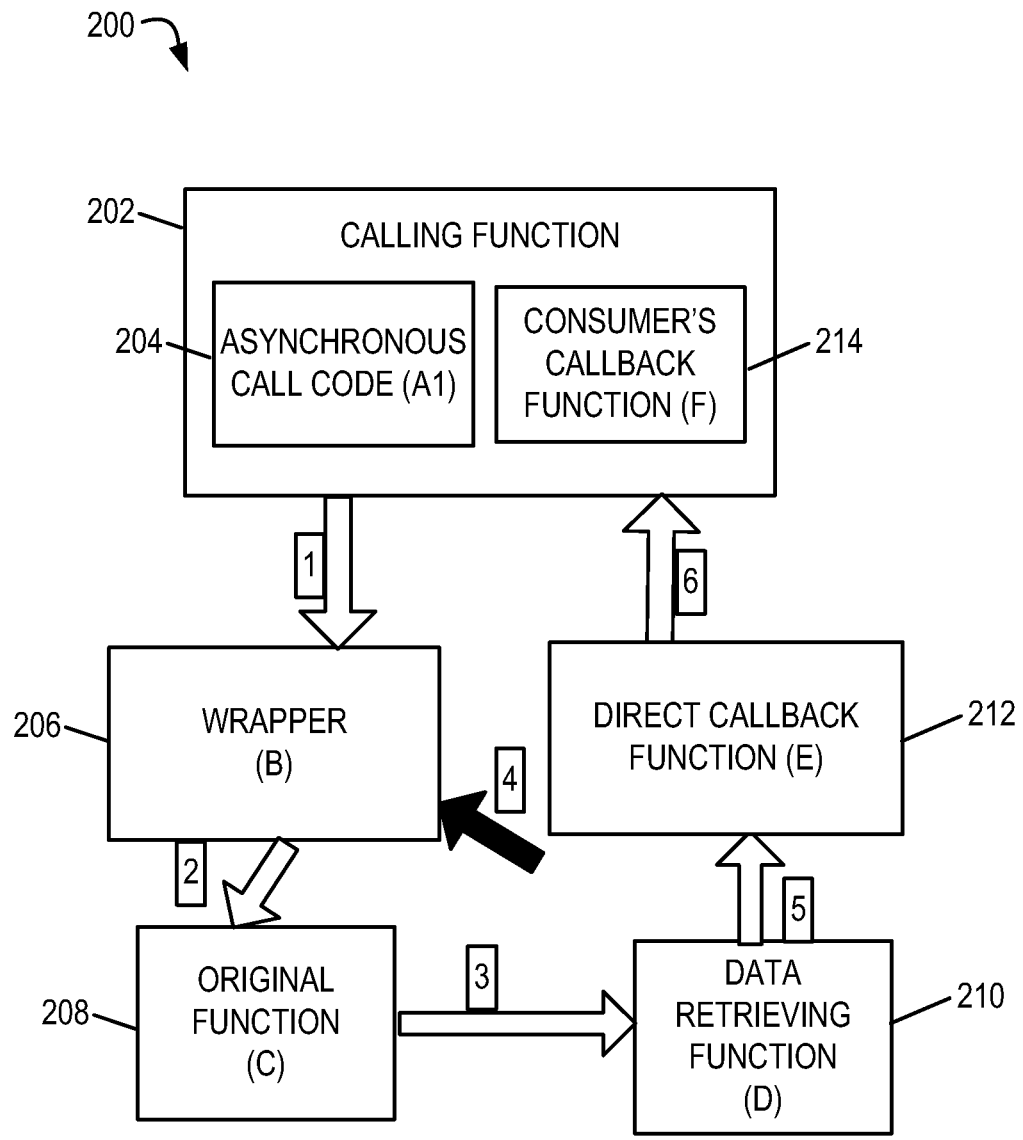
FIG. 2 is a process flow diagram for one implementation illustrating the stages involved in utilizing a wrapper to make an asynchronous call in a single threaded system.

FIG. 2 is a process flow diagram 200 for one implementation illustrating the stages involved in utilizing a wrapper to make an asynchronous call in a single threaded system. This diagram illustrates an asynchronous process for retrieving data that uses a wrapper around an original function in combination with a specially marked exception and a direct callback function. These steps will first be introduced at a high level, and then more details will be given along with code examples to further illustrate the concepts.

A calling function 202 contains a call to the original function 208. A wrapper 206 is automatically generated around the original function 208, such as dynamically at runtime. In the case where the metadata indicates that the call should be done asynchronously, such as in this example of FIG. 2, then the asynchronous call code 204 in the calling function 202 is made through the wrapper 206 to the original function 208. The wrapper 206 around the original function is used to call the data retrieving function 210. An asynchronous retrieval of data from the data retrieving function 210 is then initiated using a direct callback function 212. A "callback" is a function identifier (such as a pointer to an executable function or an inline function declaration) that is passed as a parameter in to another function that is to later be called back when a specified operation is completed.

After initiating the asynchronous retrieval of data, a specially marked exception is thrown from the data retrieving function 210 to cause control to leave the data retrieving function and the original function 208 and get caught by a special exception in the wrapper. This special exception gets swallowed (handled) by the wrapper 206 and is never propagated back up to the calling function 202. This "swallowing of the special exception" is by design to enable the processing of the data to continue that was previously initiated by the direct callback function.

When the direct callback function 212 is called because the data has been retrieved, the data is saved from the direct callback function 212, and the wrapper 206 is called again from within the direct callback function 212 in a synchronous fashion. This calling of the wrapper 206 again synchronously from the direct callback function 212 causes the wrapper 206, the original function 208, and the data retrieving function 210 to be called a second time. When the data retrieving function 210 is called the second time (this time from the direct callback function 212), the data that was saved by the direct callback function 212 previously is retrieved. The direct callback function 212 then completes by returning the data back to the calling function 202 through the consumer's callback function 214.

In one implementation, a software developer specifies the code for the calling function 202 and the original function 208, and the wrapper 206, data fetching function 210, and direct callback function 212 are generated dynamically and/ or are provided through a code library. Various other combinations of authorship are also possible, and the one mentioned above is just a non-limiting example.

FIGS. 3-8 provide some code examples to illustrate how this asynchronous scenario works in further detail. FIG. 3 illustrates some exemplary source code 230 for one implementation that illustrates exemplary metadata for designating that a particular function should be called asynchronously. In the example shown, a declaration of a new wrapper is shown 232, followed by a call to an original function named getPhotos 234 using the declared wrapper. In this example, the software developer or other user is aware of the existence of the wrapper, and writes code to utilize the wrapper to call getPhotos. In another implementation, the existence of the wrapper can be hidden from the user, where a call to getPhotos is just specified by the user, with the system then making the call through the wrapper behind the scenes. In this example shown, the call to the original function named getPhotos 234 contains a parameter that indicates that the results should be retrieved asynchronously. In this example, the parameter is a callback registration.

FIG. 4 illustrates some exemplary source code 240 for a hypothetical wrapper that gets created for an original function (called getPhotos). The wrapper has some code for recording information about the current call 242 and for returning the getPhotos result 244. The wrapper also has some error handling code 246, which can catch other errors but ensures that the specially marked exception described earlier will be swallowed here and not propagated back to the calling function.

FIG. 5 illustrates some exemplary source code 250 for the original function called getPhotos that was referenced in the calling function of FIG. 3 and in the wrapper of FIG. 4. In this example, getPhotos (the original function) contains source code for making a call to a data retrieving function 252 to retrieve the desired photos. The wrapper code shown in FIG. 4 is then used to wrap calls that are made to getPhotos of FIG. 5 so that the calls go first through the wrapper and then to getPhotos.

FIG. 6 illustrates some exemplary source code 270 for a data retrieving function that is called from the original function (getPhotos) of FIG. 5. In one implementation, the data retrieving function is provided in the form of a code library so that the special logic for handling the direct callback along that gets used in conjunction with the wrapper can be provided automatically for the user. In other implementations, the software developer or other user could provide the data retrieving function directly, or it could be created in some other fashion. In the example shown in FIG. 6, the data retrieving function (getData) has source code for checking to see if there is a saved result ready to be returned 272. This is designed to turn out to be true the second time the data retrieving function is called (because the callback will have completed successfully and saved the data). There is also source code in the data retrieving function to just return the data if the call is a synchronous call 274 (because the metadata indicated that asynchronous is not needed, or that synchronous was specifically requested). The data retrieving function also has source code for initiating the asynchronous request for the direct callback function 276 and then throwing the specially marked exception 278.

FIG. 7 illustrates some exemplary source code 280 for a direct callback function that returns results back to the original function (getPhotos). The direct callback function has source code for saving the result 282 and for calling the wrapper to getPhotos again in a synchronous fashion 284 so the saved results can be retrieved. There is also source code for passing the result back to the consumer callback function that was specified for the calling function 286. After executing the callback to return the data, the asynchronous operation is completed, and the calling function has been provided with the results.

FIG. 8 shows an example 290 of source code for specifying a consumer callback function that will receive the results 292. In the example shown, the call to getPhotos (the original function) includes a function argument as a parameter, which in this case is the consumer callback function that is being designated to receive the results. FIG. 8 is an excerpt of source code taken from the calling function shown in FIG. 3.

Turning now to FIGS. 9-13, an example will be shown to describe how the technologies and techniques involving a wrapper around an original function can be used in a synchronous fashion. In one implementation, usage of the wrapper for a synchronous scenario does not provide any additional benefits, but simply provides a system that enables the user to switch between synchronous and asynchronous by simply changing the metadata.

Figure 9:
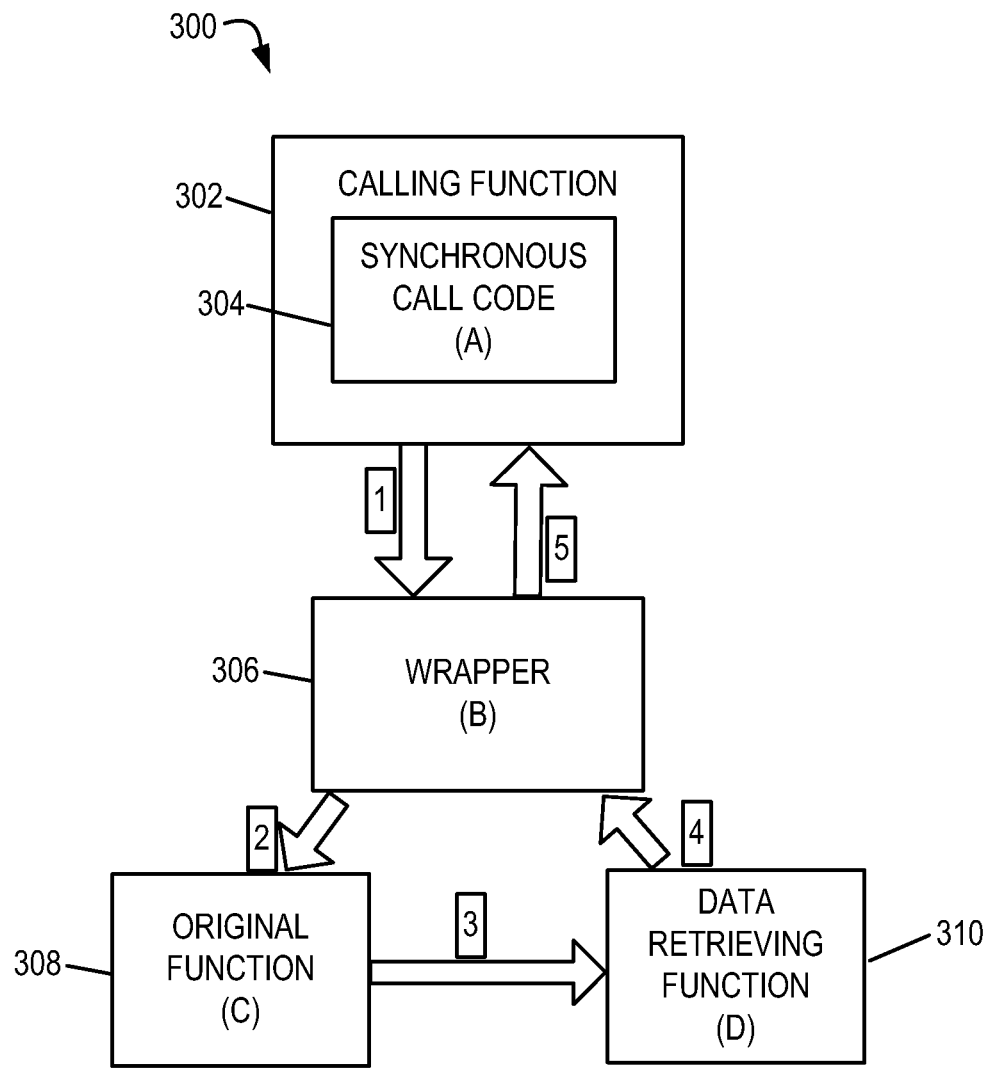
FIG. 9 is a process flow diagram for one implementation that illustrates the stages involved in utilizing a wrapper to make a synchronous call in a single threaded system.

FIG. 9 is a process flow diagram 300 for one implementation that illustrates the stages involved in utilizing a wrapper to make a synchronous call in a single threaded system. The diagram will be explained at a high level, and then exemplary source code will be provided to further illustrate the concepts. The calling function 302 contains synchronous call code 304 for calling the original function 308 through the wrapper 306. The original function 308 then calls the data retrieving function 310, which returns the results through the wrapper 306 and back to the calling function 302.

FIG. 10 illustrates some exemplary source code 330 for one implementation that illustrates some exemplary metadata for designating that a particular function should be called synchronously. In the example shown, a new wrapper object is declared 332, and then the original function getPhotos is called 334 through the previously declared wrapper. As noted in earlier discussions, in another implementation, the existence of the wrapper can be hidden from the user. In this example, the absence of a callback parameter in the call to getPhotos is actually used as the "metadata" for determining that this call can be performed synchronously.

FIG. 11 illustrates some exemplary source code 340 for a hypothetical wrapper. In this particular example, this wrapper being used for the synchronous scenario is identical to the asynchronous scenario described previously. For example, the wrapper records information about the current call 342, calls the original function getPhotos 344, and handles exceptions 346.

FIG. 12 illustrates some exemplary source code 370 for the original function (getPhotos) that is being called from the source code of FIG. 10 through the wrapper of FIG. 11. In this particular example, the original function getPhotos is also the same as the source code used in the asynchronous example described earlier. There is code for calling the data retrieving function getData 372 and for handling the result.

FIG. 13 illustrates some exemplary source code 400 for a data retrieving function that is called from the original function of FIG. 12. As with FIGS. 11 and 12, the code for the data retrieving function is also the same as it was in the asynchronous example. There is code for checking to see if there is a saved result ready to be returned 402, code for handling the synchronous call scenario 404 (which is this situation), and code for handling the callback and special exception 406. In this case, the source code for handling the synchronous call scenario 404 will be executed to retrieve the data synchronously and return the result. Thus, the end result is that the original function gets called through the wrapper, and then the data retrieving function gets called synchronously by the original function to retrieve and return the data.

Figure 14:
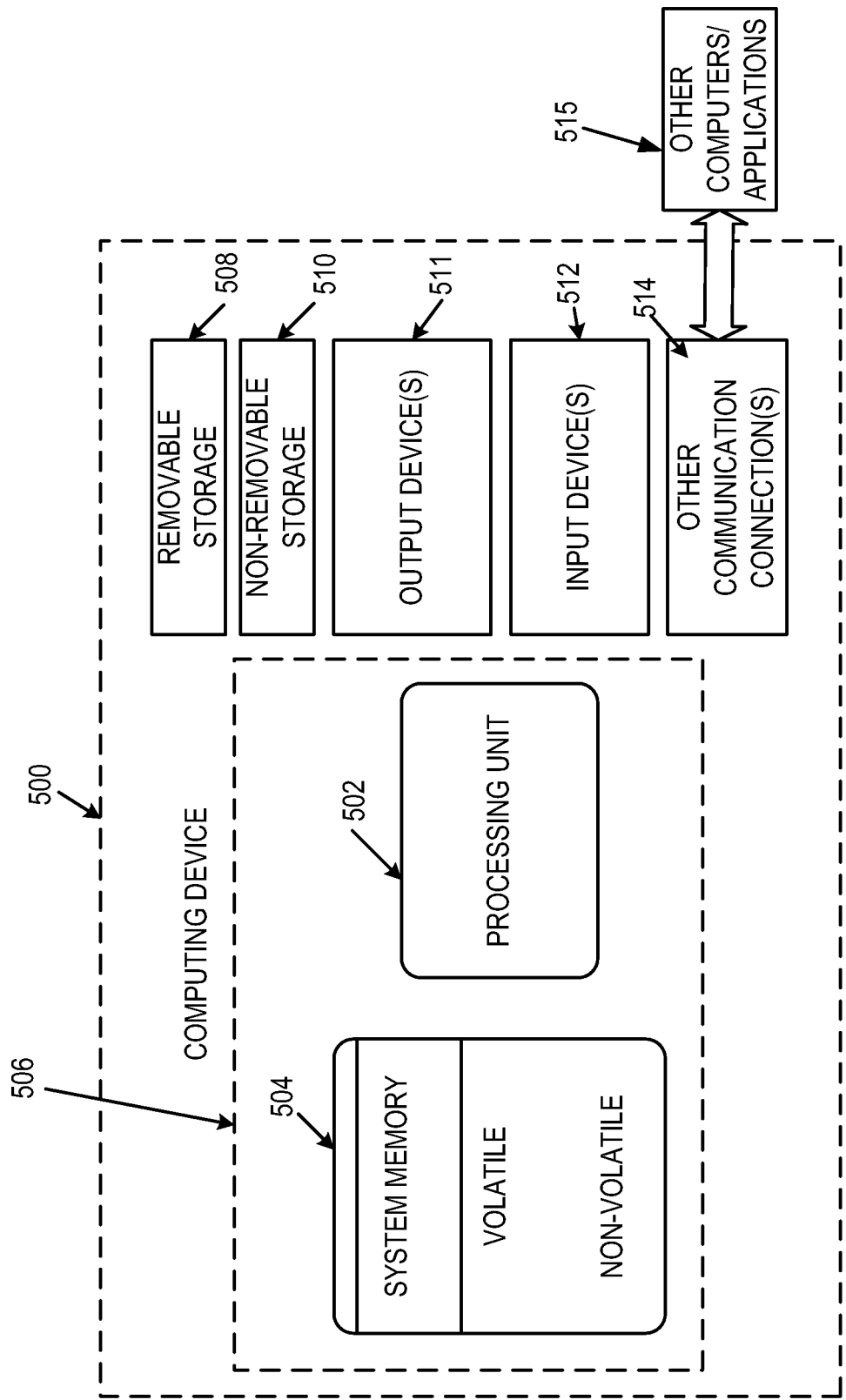
FIG. 14 is a diagrammatic view of a computer system of one implementation.

As shown in FIG. 14, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 14 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 14 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer storage memory having computer-executable instructions for causing a computer to perform steps comprising:
   in a single threaded environment, receiving metadata in a call from a calling function to the original function, the metadata indicating whether calls to a data retrieving function are to be made synchronously or asynchronously by the original function;
   in a single threaded environment, automatically generating a wrapper around an original function, wherein the wrapper is generated dynamically at runtime and generated only when the metadata indicates calls to the data retrieving function are to be made asynchronously by the original function; and
   in the single threaded environment, when metadata indicates that the wrapper should be utilized for asynchronous retrieval of data, then utilizing the wrapper around the original function to call the data retrieving function asynchronously, wherein the step of utilizing the wrapper around the original function to call the data retrieving function asynchronously comprises the steps of:
   initiating an asynchronous retrieval of data from the data retrieving function using a direct callback function;
   after initiating the asynchronous retrieval of data, throwing a specially marked exception from the data retrieving function to cause control to leave the data retrieving function and the original function and get caught by a special exception in the wrapper;
   when the direct callback function is called because the data has been retrieved, saving the data from the direct callback function, and calling the wrapper again in a synchronous fashion, which causes the wrapper, the original function, and the data retrieving function to be called a second time;
   when the data retrieving function is called the second time, retrieving the data that was previously saved by the direct callback function; and
   when control returns to the direct callback function, returning the data retrieved by the data retrieving function to the calling function by calling a consumer callback function identified for the calling function.

2. The computer storage memory of claim 1, wherein the metadata is contained in a parameter that is passed from the calling function to the original function.

3. The computer storage memory of claim 2, wherein the parameter indicates whether or not to call the data retrieving function asynchronously.

4. The computer storage memory of claim 2, wherein an absence of the parameter indicates that the data retrieving function should be called synchronously.

5. The computer storage memory of claim 1, further having computer-executable instructions for causing a computer to perform steps comprising:
   when the metadata indicates that asynchronous processing is not needed, then utilizing the wrapper to execute the original function through the wrapper in a synchronous fashion.

6. The computer storage memory of claim 1, wherein usage of the wrapper is specifically referenced as part of source code that makes a call to the original function from the calling function.

7. The computer storage memory of claim 1, wherein an existence of the wrapper is hidden from a software developer who wrote the calling function that calls the original function.

8. The computer storage memory of claim 1, wherein the single threaded environment is a browser-based environment.

9. The computer storage memory of claim 8, wherein the browser-based environment uses JavaScript.

10. The computer storage memory of claim 1, wherein the wrapper is utilized in combination with a special exception handler and a direct callback to enable the data retrieving function to return results asynchronously in a manner that appears to be synchronous.

11. The computer storage memory of claim 1, wherein the metadata allows a software developer to change between synchronous and asynchronous processing of the data without having to make any further modifications to the code beyond the metadata change.

12. A computer-implemented system for utilizing metadata specified by a software developer to control asynchronous versus synchronous processing of data in a single threaded environment comprising:
    a computing device comprising a processing unit coupled to a memory, the memory storing executable instructions, which when executed by the processing unit perform actions comprising:
    in a single threaded environment, receiving metadata in a call from a calling function to an original function, the metadata indicating whether calls to a data retrieving function are to be made synchronously or asynchronously by the original function;
    accessing the metadata, the metadata specified by a software developer in source code to determine whether or not data retrieval that is initiated by the original function should be performed asynchronously; and
    only when the metadata indicates that the data retrieval should be performed asynchronously, then, in the single threaded environment, using a computing device, creating a wrapper around the original function and utilizing the wrapper around the original function to call the data retrieving function asynchronously, wherein utilizing the wrapper around the original function to call the data retrieving function asynchronously comprises:
        initiating an asynchronous retrieval of data from the data retrieving function using a direct callback function;
        after initiating the asynchronous retrieval of data, throwing a specially marked exception from the data retrieving function to cause control to leave the data retrieving function and the original function and get caught by a special exception in the wrapper;
        when the direct callback function is called because the data has been retrieved,
        saving the data from the direct callback function, and calling the wrapper again in a synchronous fashion, which causes the wrapper, the original function, and the data
        retrieving function to be called a second time;
        when the data retrieving function is called the second time, retrieving the data that was previously saved by the direct callback function; and
        when control returns to the direct callback function, returning the data retrieved by the data retrieving function to the calling function by calling a consumer callback function identified for the calling function.

13. The computer-implemented system of claim 12, wherein by simply changing a value of the metadata, enabling the software developer to adjust whether or not the data retrieval function is called asynchronously or synchronously without further coding changes being required from the software developer.

14. The computer-implemented system of claim 12, the memory further storing executable instructions, which when executed by the processing unit perform actions comprising:
    when the metadata indicates that the data retrieval function should be called synchronously, then creating a wrapper around the original function and utilizing the wrapper around the original function to call a data retrieving function synchronously.

15. The computer-implemented system of claim 12, the memory further storing executable instructions, which when executed by the processing unit perform actions comprising:
    when the metadata indicates that the data retrieval function should be called synchronously, then calling the data retrieving function synchronously.

16. A method for utilizing a wrapper around an original function in a single threaded environment to enable asynchronous calls to be made in a manner that appears to be synchronous comprising the steps of:
    in a single threaded environment, using a processing unit, receiving metadata in a call from a calling function to the original function, the metadata indicating the wrapper should be utilized for retrieving data asynchronously; and
    only when the metadata indicates that the wrapper should be utilized for retrieving data asynchronously, then, in the single threaded environment, using the processing unit, automatically generating the wrapper around the original function dynamically at runtime, and performing an asynchronous process for retrieving the data that comprises the steps of:
    using the processing unit, utilizing the wrapper around the original function to call a data retrieving function;
    initiating an asynchronous retrieval of data from the data retrieving function using a direct callback function;
    after initiating the asynchronous retrieval of data, throwing a specially marked exception from the data retrieving function to cause control to leave the data retrieving function and the original function and get caught by a special exception in the wrapper;
    when the direct callback function is called because the data has been retrieved, saving the data from the direct callback function, and calling the wrapper again in a synchronous fashion, which causes the wrapper, the original function, and the data retrieving function to be called a second time;
    when the data retrieving function is called the second time, retrieving the data that was saved by the direct callback function; and
    when control returns to the direct callback function, returning the data retrieved by the data retrieving function to the calling function by calling a consumer callback function identified for the calling function.

17. The method of claim 16, further comprising the steps of:
    when metadata indicates that the wrapper should be utilized for retrieving data synchronously, then utilizing the wrapper around the original function to call a data retrieving function synchronously.

18. The method of claim 16, wherein the single threaded environment is a browser-based JavaScript environment.

* * * * *